United States Patent [19]
Dudill et al.

[11] Patent Number: 5,329,545
[45] Date of Patent: Jul. 12, 1994

[54] TUYERE FOR INSTALLATION IN HEARTH OF ELECTRIC ARC FURNACE

[75] Inventors: Roger Dudill, Solihull; Michael F. E. Kingston, Warrington, both of United Kingdom

[73] Assignee: Air Products and Chemicals, Inc., Allentown, Pa.

[21] Appl. No.: 987,034

[22] Filed: Dec. 7, 1992

[30] Foreign Application Priority Data

Dec. 7, 1991 [GB] United Kingdom ............... 9126068

[51] Int. Cl.$^5$ ............................ F27D 1/00; C21B 7/16
[52] U.S. Cl. ........................................ 373/72; 373/22; 266/265
[58] Field of Search ............... 373/22, 2, 72, 18, 24, 373/71, 62, 79, 161, 84, 85; 266/222, 265, 266, 268, 145, 158, 248, 44; 75/10.4, 10.22, 10.61, 59

[56] References Cited

U.S. PATENT DOCUMENTS

| | | | |
|---|---|---|---|
| 3,703,279 | 11/1972 | Saccomano et al. | 266/41 |
| 3,802,684 | 4/1974 | Rote | 266/41 |
| 4,022,447 | 5/1977 | Griffiths | 266/266 |
| 4,266,970 | 5/1981 | Iwaoka et al. | 75/59 |
| 4,417,723 | 11/1983 | Kitamura et al. | 266/265 |
| 4,795,138 | 1/1989 | Fuhrhop et al. | 266/44 |

FOREIGN PATENT DOCUMENTS 1440351 6/1976 United Kingdom .

Primary Examiner—Bruce A. Reynolds
Assistant Examiner—Tu Hoang

[57] ABSTRACT

Molten metal in an electric arc furnace is stirred by introducing a gas into the melt through tuyeres mounted in the hearth. Each tuyere has an inlet portion having a passage of relatively large diameter and an outlet portion having a passage of relatively small diameter. The tuyere is mounted in the bottom of the electric arc furnace with the inlet portion extending through the furnace shell and part of the refractory brickwork. With this design of tuyere gas at conveniently available pressure (16 bar A) can be fed to the tuyere and leaves the outlet portion at least at sonic velocity thus forming a relatively stable jet which inhibits molten metal entering the tuyere. The outlet portion may have a first portion with a slightly larger internal diameter than a second portion downstream of the first portion. When the second portion is fully eroded the flow of gas increases and triggers an alarm. However, the internal diameter of the first portion is still at least sonic to inhibit the ingress of molten metal into the tuyere.

12 Claims, 2 Drawing Sheets ial. To counteract this problem one commercial installation includes a compressor and a battery of storage vessels constructed to contain oxygen and argon at 26 bar A. It will be appreciated that the cost of this additional equipment is very high. An alternative solution has been to use high pressure storage vessels and to pressurize them to the desired level. Such high pressure vessels are also very expensive.

The aim of at least preferred embodiments of the present invention is to provide a simple and inexpensive alternative to the prior art described.

SUMMARY OF THE INVENTION

According to the present invention there is provided a tuyere for installation in the hearth of an electric arc furnace, said tuyere comprising an inlet portion adapted to extend into the hearth of said electric arc furnace, and an outlet portion, wherein said inlet portion includes a passage of a first cross-sectional area therethrough, said outlet portion includes a passage of a second cross-sectional area therethrough, said first cross-sectional area is greater than said second cross-sectional area, and wherein at least one cooling passage is provided for cooling said outlet portion, the arrangement being such that, in use, when said inlet portion is connected to a source of gas at 18 bar A said gas leaves said tuyere at at least sonic velocity.

Advantageously, the arrangement is such that, in use, when said inlet portion is connected to a source of gas at at least 12 bar A said gas leaves said tuyere at at least sonic velocity.

Preferably, the passage of said inlet portion and said outlet portion are of circular cross-section.

Preferably, the passage of said outlet portion has a cross-sectional area of from 3 mm$^2$ to 110 mm$^2$, more preferably from 12 mm$^2$ to 50 mm$^2$, and most preferably 24 mm$^2$.

Advantageously, said outlet portion has a length of from 200 mm to 500 mm, preferably from 250 mm to 450 mm, and most preferably 300 mm.

Preferably, said passage of said inlet portion has a cross-sectional area from 20 mm$^2$ to 220 mm$^2$, more preferably from 60 mm$^2$ to 150 mm$^2$, and most preferably 112 mm$^2$.

Preferably, the outlet portion is made from a material selected from the group consisting of stainless steel, copper and mixtures thereof.

Advantageously, the inlet portion is made from a material selected from the group consisting of stainless steel, copper, carbon steel and mixtures thereof.

Preferably, said cooling passage comprises an annulus circumjacent said outlet portion. Alternatively, cooling might be effected, for example by a plurality of tubes disposed circumjacent said outlet portion.

Advantageously, said cooling passage is disposed to cool both said inlet portion and said outlet portion.

In use, the outlet portion of the tuyere will be progressively eroded. In order to be able to detect a certain amount of wear before the entire outlet portion is eroded the outlet portion preferably comprises a first portion and a second portion downstream of said first portion, wherein said first and second portions each have a passage extending therethrough, and wherein the cross-sectional area of the passage in said first portion is greater than the cross-sectional area of the passage in the second portion.

The present invention also provides an electric arc furnace having a hearth provided with at least one tuyere in accordance with the invention.

Preferably, the inlet portion of said tuyere is connected to a source of gas at a pressure of from 12 to 18 bar A. Suitable gases include oxygen, argon, nitrogen, carbon dioxide and hydrocarbons, for example natural gas, methane, propane, butane and mixtures thereof.

For a better understanding of the present invention reference will now be made, by way of example, to the accompanying drawings, in which:

DESCRIPTION OF THE INVENTION

Figure 1:
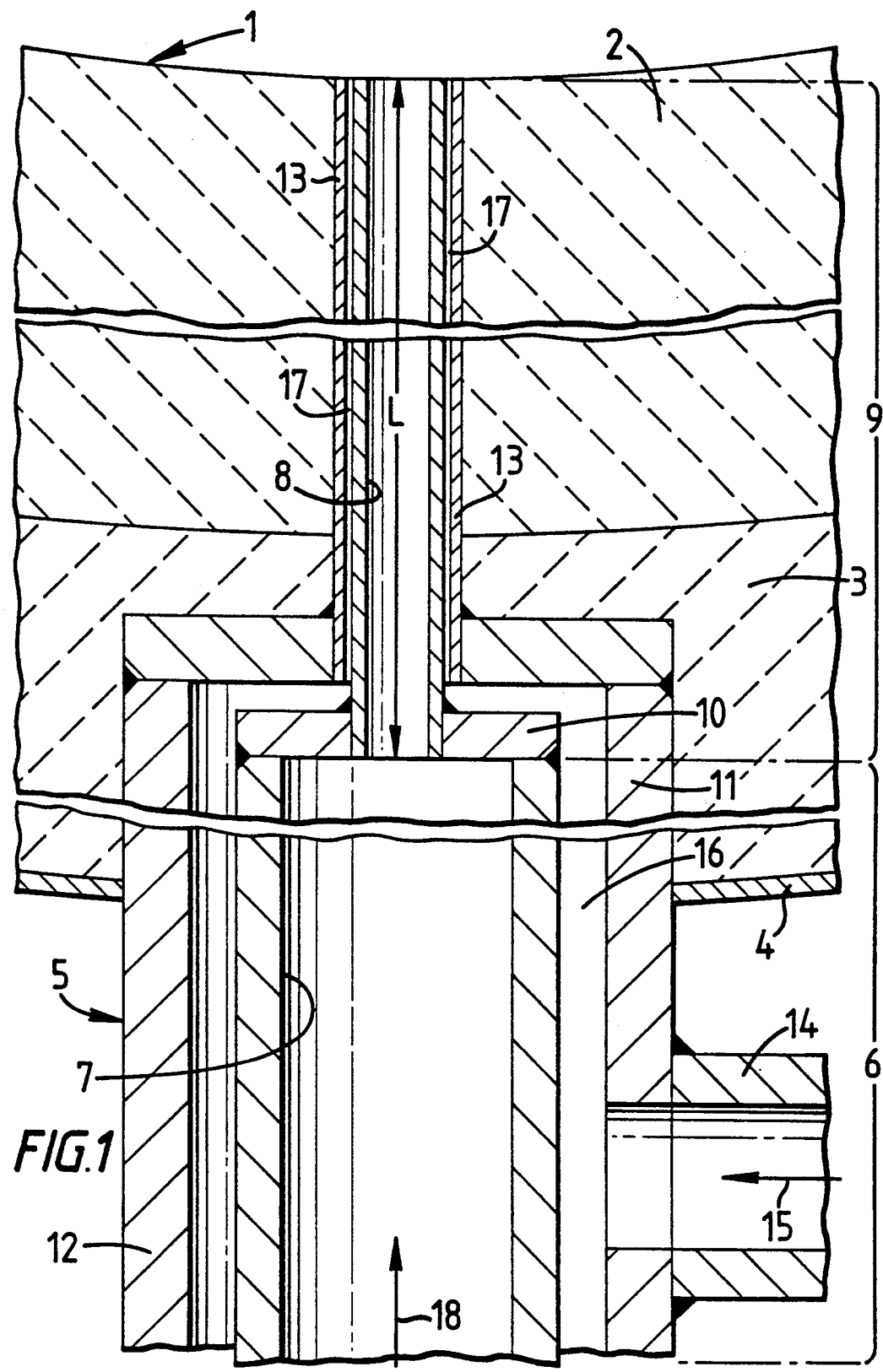
FIG. 1 is a schematic fragmentary cross-section showing one embodiment of a tuyere in accordance with the present invention mounted in the hearth of an electric arc furnace.

Referring to FIG. 1, there is shown part of the hearth of an electric arc furnace. The hearth, which is generally identified by reference numeral 1 comprises a refractory lining 2 which is supported by several courses of refractory bricks 3 on a furnace shell 4.

A tuyere 5 passes through the hearth 1. The tuyere 5 comprises an inlet portion 6 having a passage 7 of circular cross-section which extends through the inlet portion 6. The passage 7 connects with a passage 8 in an outlet portion 9 of the tuyere 5. The diameter of the passage 8 is about 5.5 mm and is small compared with the diameter of the passage 7 which is about 20.93 mm.

The inlet portion 6 and the outlet portion 9 are connected by an end plate 10. The inlet portion 6 and the outlet portion 9 are enclosed by an outer housing 11 which includes a first portion 12 circumjacent the inlet portion 6 and a second portion 13 circumjacent the outlet portion 9.

In use, a stream of gaseous argon or nitrogen is continually passed through inlet 14 in the direction of arrow 15 and flows upwardly through the annular passageways circumjacent inlet portion 6 and outlet portion 9 to keep them cool.

Oxygen (or nitrogen or argon) at 16 bar A is applied to the inlet section 7 in the direction of the arrow 18.

The argon passes from passage 7 into passage 8 as it travels therealong reaching sonic velocity according to the Fanno effect.

In use, the oxygen leaves the tuyere 5 at at least sonic velocity and enters a pool of molten metal above hearth 1. The oxygen leaving the tuyere 5 forms a stable jet which inhibits molten metal entering the tuyere 5.

When it is no longer desired to oxidize materials in the molten metal the oxygen is replaced with argon.

It should be noted that the cooling gas also leaves annular passageway 17 at at least sonic velocity.

In contrast to the prior art, it will be noted that the inlet portion 6 extends through the furnace shell 4 and part of the way through the refractory bricks 3.

It will be appreciated that the entire tuyere can be removed from underneath the hearth 1 in contrast to existing tuyeres which have to be replaced from inside the electric arc furnace.

In a preferred embodiment the length L of the outlet portion is about 300 mm. The diameter of the passage 8 is about 5.5 mm. The outer diameter of the outlet section 9 is 8 mm and the inner diameter of the second portion 13 about 9.3 mm.

In use, the outlet portion 9 of the tuyere 5 is progressively eroded. Obviously, if the entire outlet portion 9 were to be eroded then the relatively low velocity of gas leaving the inlet portion 6 would be insufficient to prevent molten metal entering the inlet portion 6, solidifying and blocking the tuyere 5.

Whilst it would be possible to replace tuyeres at regular intervals, for example once every two weeks, differing local conditions cause some tuyeres to deteriorate more quickly than others.

Figure 2:
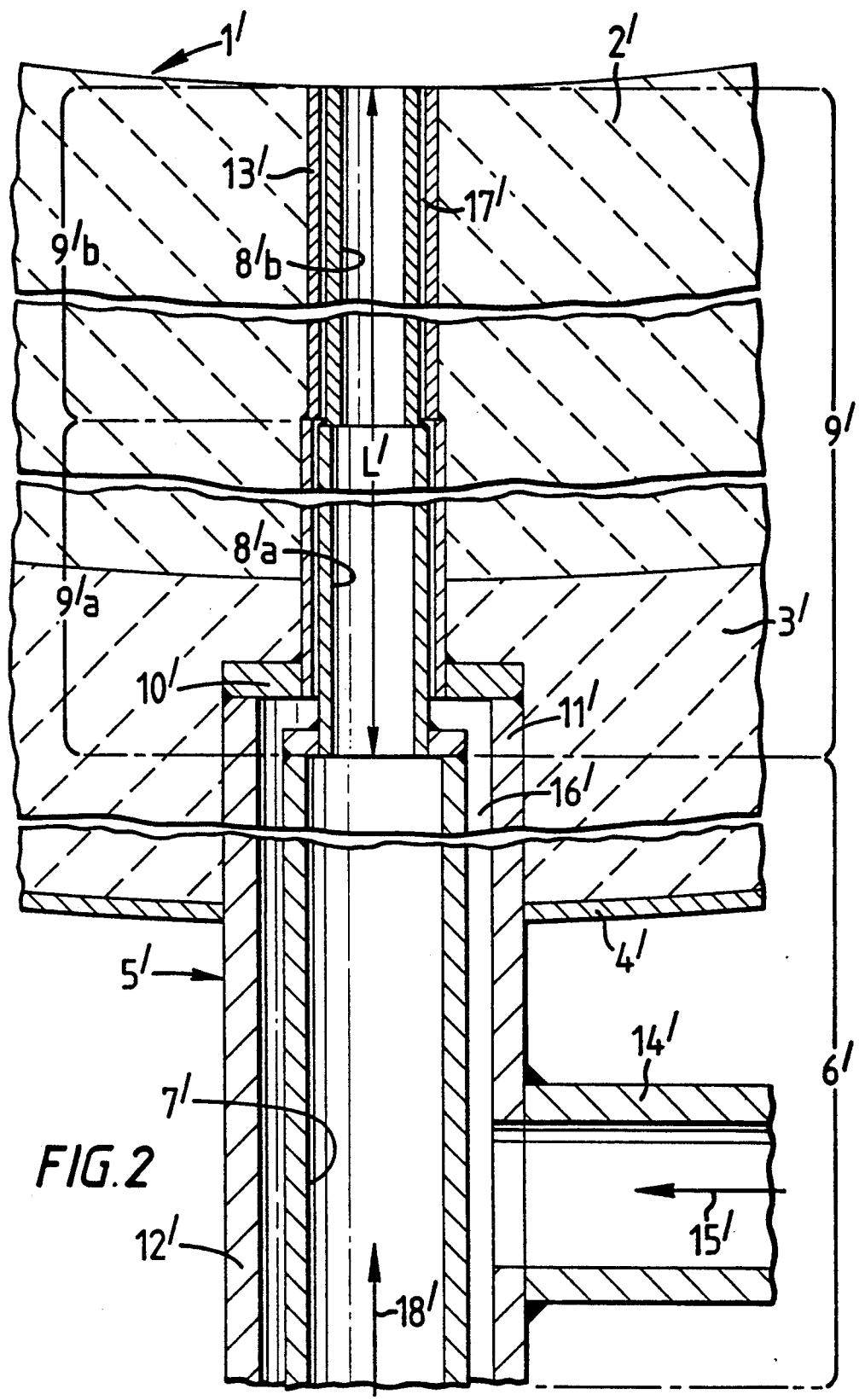
FIG. 2 is a schematic cross-section showing a second embodiment of a tuyere in accordance with the present invention.

Referring now to FIG. 2, there is shown a tuyere 5' which is generally similar to the tuyere 5 shown in FIG. 1. Parts having similar functions have been identified by the same reference numerals as used in FIG. 1 with the addition of an apostrophe.

The tuyere 5' differs from the tuyere 5 in that the outlet portion 9' comprises a first portion 9'a and a second portion 9'b. The internal diameter of the passage 7' is 12 mm whilst the internal diameter of the passage 8'a is 7.09 mm and passage 8'b is 5.5 mm.

In use, oxygen and/or inert gas initially leave the outlet portion 9' at sonic velocity. The second portion 9'b is progressively eroded until it reaches first portion 9'a. Although the flow leaving the first portion 9'a remains at least sonic, sensors (not shown) detect a significant change in the gas flow which actuates an alarm indicating that the tuyere 5' should be replaced at the end of the melt.

We claim:

1. A tuyere for injecting gas into a refractory lined hearth of an electric arc furnace comprising an inlet portion and an outlet portion, said tuyere adapted for removable insertion into said hearth of said furnace with part of said inlet portion extending outwardly of said furnace and said outlet portion extending through said refractory lined hearth to conduct gases from outside said furnace into said refractory lined hearth;

said inlet portion including a primary inlet passage of a first cross-sectional area therethrough, said primary inlet passage surrounded by a first annular passage;

said outlet portion including a primary outlet passage of a second cross-sectional area therethrough, said primary outlet passage surrounded by a second annular passage; said first cross-sectional area being greater than said second cross-sectional area, said primary inlet and outlet passages are in fluid communication with each other; said primary inlet passage adapted to introduce a high pressure gas into said tuyere; said primary inlet and outlet passages constructed and arranged so that gas exiting said tuyere into said furnace is at supersonic velocity when said gas introduced into said tuyere has a source pressure of at least 18 bar absolute;

said first and second annular passages are in fluid communication with each other and constructed and arranged to permit a cooling gas to surround said primary inlet and outlet passages and exit said tuyere inside said furnace.

2. A tuyere as claimed in claim 1, wherein said outlet portion comprises a first portion and a second portion downstream of said first portion, wherein said first and second portions each have a passage extending therethrough, and wherein the cross-sectional area of the passage in said first portion is greater than the cross-sectional area of the passage in the second portion.

3. A tuyere as claimed in claim 1, wherein said primary inlet and outlet passages are of circular cross-section.

4. A tuyere as claimed in claim 1, wherein said primary outlet passage has a cross-sectional area of from 3 mm² to 110 mm².

5. A tuyere as claimed in claim 4, wherein said primary outlet passage has a cross-sectional area of from 12 mm² to 50 mm².

6. A tuyere as claimed in claim 5, wherein said primary outlet passage has a cross-sectional area of 24 mm².

7. A tuyere as claimed in claim 1, wherein said outlet portion has an overall length of from 200 mm to 500 mm.

8. A tuyere as claimed in claim 7, wherein said outlet portion has an overall length of from 250 mm to 450 mm.

9. A tuyere as claimed in claim 8, wherein said outlet portion has a length of 300 mm.

10. A tuyere as claimed in claim 20, wherein said primary inlet passage has a cross-sectional area of from 20 mm² to 220 mm².

11. A tuyere as claimed in claim 10, wherein said primary inlet passage has a cross-sectional area of from 60 mm² to 150 mm².

12. A tuyere as claimed in claim 11, wherein said primary inlet passage has a cross-sectional area of 112 mm².

* * * * *